United States Patent Office 3,266,573
Patented August 16, 1966

3,266,573
METHOD OF FRACTURING SUBSURFACE FORMATIONS
Frederick H. Rixe, Tulsa, Okla., assignor to Pan American Petroleum Corporation, Tulsa, Okla., a corporation of Delaware
No Drawing. Filed Mar. 25, 1964, Ser. No. 354,782
8 Claims. (Cl. 166—42)

This invention relates to increasing the productivity of wells penetrating subsurface fluid-producing formations. More particularly, it relates to an improved method for increasing the flow capacities of fractures extending into such formations.

As disclosed in Farris, U.S. Reissue Patent 23,733, it is known to hydraulically fracture subterranean formations to increase the production therefrom of oil or the like, and it is also known to place particles of materials such as sand, shell, metal or the like in such a fracture to prop open the fracture and increase the flow capacity thereof. For example, rounded sand particles passing a No. 20 U.S. Standard sieve and retained on a No. 40 U.S. Standard sieve have often been used as a propping material. Such materials typically are suspended in a fluid passed down the well so that the particles are carried into the fracture and deposited therein, the concentration of the particles in the fluid typically being in the range of about ½ lb./gal. to about 5 lb./gal., with the typical usage being about 1½ lb./gal.

Various types of propping materials have been employed to achieve increased flow capacities and the particle size of the propping materials has been varied for the same purpose. It has been found that varying the particle size of sand has had little effect on increasing the flow capacity of fractures in wells at depths of 6,000 feet or greater. On the other hand, malleable propping materials, such as ground nutshells, nylon, metals, or other such particles, employed as relatively large particles in low concentrations have been found to produce a remarkable increase in the flow capacity of fractures. For example, black walnut shells ground and sieved to a 4 to 10 mesh range and employed in a concentration ranging from about 1/20 to about 1 lb./gal. have been found to achieve a flow capacity a number of times greater than that obtainable with sand.

It has further been found desirable to place the propping material in the fracture in the form of a monolayer, and highly advantageous results are obtained by the use of a partial monolayer so that high flow capacity channels are provided between the particles so placed in the fracture. One method heretofore proposed for achieving a partial monolayer of propping material is to dilute the propping material with a solid material which is subsequently removed from the fracture. The diluent materials heretofore proposed have generally been of substantially the same particle size as the propping material and soluble in a fluid passed into the fracture, so that the diluent material can be dissolved, leaving a partial monolayer of propping material. However, the prior art diluent materials have mostly been relatively expensive resins or inorganic salts, and some of these materials have required the use of relatively expensive solvents for removing the diluent from the fracture. With such materials special fracturing equipment is often necessary for placing the particles and/or the fracturing fluid must be adjusted to be compatible with the materials used.

The general object of the present invention is an improved method for increasing the permeability of fractures in subsurface formations. A further object is such a method employing an economical diluent material to achieve a partial monolayer propping material in the fracture which diluent material is inert, easily handled and stored, and capable of use with standard fracturing equipment and techniques. Further objects of the invention will become apparent from a reading of the following description of the invention.

In accordance with the present invention, increased permeability of fractures in subterranean formations is achieved by depositing in a fracture a partial monolayer of relatively large particles of a propping material and relatively small particles of a spacer material, with the spacer material being subsequently flushed from the fracture to provide high capacity flow channels between the particles of propping material retained in the fracture. The volume ratio of the spacer material to the propping material is such as to achieve a partial monolayer of propping material providing the desired flow capacity in the fracture.

Typically, in fracturing a subterranean formation penetrated by a well bore, a formation packer is located and set in the well on the tubing to isolate and confine a selected producing zone which is to be fractured. A "low penetrating fluid," as described in Reissue Patent 23,733, is prepared and pumped into the well to contact the formation to be fractured under pressure. The low penetrating fluid is a fluid which has a retarded tendency to filter through the formation, and may be of high viscosity (relative to water or crude oil) and/or it tends to form a filter cake on permeable formations. The pumping of the low penetrating fluid is continued and the pressure increased until the formation breakdown pressure is reached. This is generally determined by a rapid decrease in surface pressure, which after fracturing has occurred, continues at a substantially constant value. Thereafter additional fluid may be injected, if desired, to further extend the fracture. After the desired fracture has been obtained, a fluid suspension of a mixture of propping particles and spacer particles is passed down the well to deposit these particles in the fractured zone, as described hereinbelow.

As used herein, the term "propping material" refers to relatively large particles of granular material employed to prop open a fracture, and the term "spacer particle" refers to relatively smaller particles of granular material employed to dilute the propping particles and to provide the desired spacing of the propping particles, whereby the desired partial monolayer of propping particles is achieved. In referring to the particle sizes of the spacer and propping particles employed in the invention, U.S. Standard sieve numbers are used herein, and ranges of particle size indicated by the designation −60 +200 mesh, for example, refer to particle sizes ranging from those just barely passing through a 60-mesh U.S. Standard sieve down to those retained on a 200-mesh U.S. Standard sieve.

Various materials may be used for propping open a fracture. Generally, the propping particles are of a particle size ranging up to a maximum size which will pass between the faces of the fracture without causing bridging or plugging of the fracture. For example, propping particles of a size barely passing through a No. 4 U.S. Standard sieve (0.187") may be employed, and the particle size of the propping particles may range down to a dimension just barely passing through a No. 30 U.S. Standard sieve (0.0232"). It is important that the propping particles be of a generally rounded shape, and greater degrees of roundness are preferred. However, in many instances, the particles will not be perfectly round and particles having lower degrees of roundness may be employed. Preferably, the rounded particles, as measured by the Krumbein roundness test, range from a lower limit of about 0.7 to 1, the latter indicating perfect roundness.

The propping material employed in the invention must have a compression strength great enough to support the overburden pressure, and a minimum satisfactory compressive strength is about 5,000 p.s.i. and preferably at least about 10,000 p.s.i. However, materials having a compressive strength in the range of about 20,000 p.s.i. are advantageously employed. Such high strength materials are hard seed particles, such as black walnut shells, Brazil nut covers, hickory nut shells, peach pits, cherry pits, apricot pits, prune seeds and various metallic materials such as aluminum, magnesium, copper, beryllium, titanium, and other such metals and their alloys. Of course, the propping material should have a suitable strength at the well temperature, and various plastics, such as nylon, Delrin, or other such materials may be employed as propping materials where suitable for the particular well conditions. Advantageously, the propping material is malleable, i.e., capable of deforming under the pressure of the overburden, rather than being one which will shatter into many smaller particles upon being exposed to pressure of the overburden. For example, sands and other relatively brittle materials have been found to shatter readily along cleavage planes to produce a large number of small particles which readily cause bridging and plugging of the fracture, while at the same time permitting less than optimum propping of the fracture. One criterion for determining the malleability of metals which may be employed as propping particles is the deformability index. This index is determined by compressing a spherical ball of the propping material between strong hard plates and measuring the amount of reduction in the diameter of the ball. The deforming force imposed on the sphere and the size of the sphere will determine the deformation. Typically, a load of 100 pounds is imposed on a sphere 0.05" in diameter placed between tungsten carbide plates. The percent deformation occurring then provides a direct comparison of the deformability of the materials. To compensate for minor variations in diameter of the particles being tested, the load may be adjusted so that the applied load divided by the square of the particle diameter is about 20,000. Typical deformability indexes for several materials are shown in the following table.

Material: | Deformability index
--- | ---
Walnut shells | 56
Aluminum | 44
6% silicon aluminum alloy | 29
Aluminum alloy 5052 | 25
Steel shot | 8

The optimum spacing of the propping particles in the fracture will be determined by the relative hardnesses of the formation and the propping material and by the deformability index of the propping material. For example, propping materials which readily deform under the overburden pressure tend to flatten out, permitting the fracture faces to come closer together, while the propping particles are extruded laterally to occupy a portion of the otherwise open flow channels between the particles. Also, if the propping particles are very hard and have a high compressive strength in relation to the hardness and strength of the formation, at greater depths and greater overburden pressures the propping particles tend to become embedded in the formation so that the distance between the fracture faces is decreased. Consequently, the size and physical properties of the propping particles must be related to the depth and physical characteristics of the formation in arriving at the spacing of the propping particles which will produce a satisfactory flow capacity in the fracture.

For example, for a prop size in the 4 to 20 mesh range, if the props are made of a malleable material having a deformability index in the range of about 5 to 60, and if the props are deposited in a fracture in a concentration of about 50% to 20% of a full layer, very good results are obtained. If the props are made of a malleable material having a deformability index in the range of about 15 to 35, then excellent results will be obtained for prop sizes from about 4 to about 40 mesh for formations of a wide range of hardness and for concentrations in the fracture down to about 10% of a full monolayer. With very hard formations, such as the San Andres (Texas) formation, propping materials having a deformability factor of about 55, characteristic of walnut shells, can be used satisfactorily in a concentration as low as about 10% of a full layer in a fracture, where the propping particles are larger than 20 mesh in size. However, with such hard formations, props having a low deformability index of about 10, characteristic of steel, not only can be used in low concentrations of about 10% of a full layer, but by far the best results are obtained by these strong props in such a low concentration whether the props are large or small.

The spacer materials employed to dilute the propping particles are preferably inert materials which the unaffected by the fracturing fluid or by other fluids in the well. Preferably, fine, rounded sand is employed as the diluting material. These particles should have a roundness, as measured by the Krumbien roundness test, of at least 0.7. It is extremely important that the size of the spacer particles be such, in relation to the propping particles, that the mixture of particles can be passed down the well and into the fracture without any substantial segregation of the two types of particles. This is important in order that the desired spacing of the propping particles is maintained substantially uniformly throughout the fracture. Ideally, the densities, particle sizes and shapes of the two materials are such that for a given pumping rate the materials flow together into the fracture. However, as a matter of practice, considerable leeway in these characteristics is permissible, and, of course, these characteristics may be adjusted to provide the desired flow pattern. It is very important that the particle size of the spacer material is small enough in relation to the particle size of the propping material so that the spacer particles can be flushed from the fracture without bridging and causing the fracture to become plugged when the flushing operation begins. Very small spacer particles are preferred, as long as the size of the spacer particles is not such as to cause them to become colloidal in the carrier fluid.

Advantageously, the volume ratio of the spacer material to the prop material is maintained between about 2:1 and about 10:1 so as to achieve the desired prop spacing. The ratio of these materials can be determined on a weight ratio basis, however, if desired. Preferably, the spacer and propping particles have about the same density, although the densities need not be identical. For example, rounded walnut shells and other such particles have a density, compared to water, of about 1.4, while aluminum, aluminum alloys, sand, glass beads and the like have densities of about 2.6–2.7.

The sand employed as a spacer material typically has particle sizes ranging from the smallest through the largest diameters contained in the size range of the sand employed. For example, a McLish sand having particles in the range passing through a 60 mesh sieve and retained on a 200 mesh sieve has the following size distribution:

| Screen Size | Percent of Total | Particle Diam. (in.) |
| --- | --- | --- |
| 60 | 5.4 | 0.0098 |
| 70 | 15.80 | 0.0083 |
| 80 | 23.7 | 0.0070 |
| 100 | 37.7 | 0.0059 |
| 140 | 10.5 | 0.0041 |
| 170 | 6.9 | 0.0035 |

The average particle size of the propping material employed in the invention is at least 7 times that of the spacer material, and preferably is at least 10 times that of the spacer material. As used herein, the term "average particle size" refers to the average weighted diameters of the range of particle sizes in the material employed, rather than to the numerical average of the maximum and minimum particle sizes. For example, in the above described −60 +200 mesh McLish sand, the average particle size was determined by multiplying the percentage of a given particle size by the diameter, and adding the resultant products. The sum of these products divided by 100 then gave the average weighted diameter of the particles, which was 0.0064 inch.

The average weighted diameter of the propping particles employed in the practice of the invention is determined in the same manner as in connection with the propping material particles. Thus, for example, particles of −12 +16 mesh aluminum alloy having 29.3% of the particles just passing through a 12 mesh sieve and 70.7% just passing through a 14 mesh sieve were found to have an average weighted diameter of 0.059. Thus, the average particle size ratio between the aluminum alloy propping material and the McLish sand spacer material is 0.059 divided by 0.0064, or about 9:1. In placing the mixture of propping particles and spacer particles in the well, as mentioned above, it is necessary to provide a flow rate adequate to carry the particles far enough into the fractures for the particles to be satisfactorily deposited there-effective overburden pressure previously derived from field data. The flow capacity was determined by flowing nitrogen under a measured differential pressure through the fracture from a central hole drilled in the upper half of each core assembly. The flow capacities are reported in units of millidarcy-feet, in accordance with well productivity calculations, such as those described on page 91 of "Fundamentals of Reservoir Engineering" by John C. Calhoun, University of Oklahoma Press. A flow capacity in millidarcy-feet is the permeability of the fracture multiplied by its height or, as more commonly stated, its feet by width. The hydraulic pressure on the ram in these tests was about 10,000 p.s.i.g., which corresponds to an equivalent overburden pressure at a depth of 11,600 feet.

The embedment pressure of the cores employed in the above tests, i.e., the load required to embed a hardened steel ball into the core, was 252,100 pounds for the tests marked (1), and 259,300 pounds for the tests marked (2). The fracture capacities for a full monolayer for both the −12 +16 mesh and the −12 +14 mesh alloy aluminum particles was 4200 millidarcy-feet, and 1770 millidarcy-feet for the −12 +20 mesh rounded nutshells. The average diameter for the −12 +16 mesh alloy aluminum particles was 0.059 inch; for the −12 +20 mesh rounded nutshells, 0.049 inch; and for the −12 +14 mesh alloy aluminum particles, 0.066 inch.

*Comparative fracture capacity tests*

[11,600 ft. depth]

| Propping Material | Prop Size U.S. Std. Sieve Ser. | Monolayer Fraction of Spaced Prop | Solid Spacer Type | Spacer Size U.S. Std. Sieve Ser. | Fracture Capacity, md-ft. Before Flush | Fracture Capacity, md-ft. After Flush | Average Spacer Dia. (in.) | Ratio Avg. Prop Dia. to Avg. Spacer Dia. | Wt. Ratio of Spacer to Proppant | Water Flush Rate (g.p.m.) |
|---|---|---|---|---|---|---|---|---|---|---|
| Alloy Aluminum (1) | −12 +16 | 0.25 | McLish Sand | −60 +200 | 82 | 42,977 | 0.0064 | 9.2 | 4.1 | 0.5 |
|  | −12 +16 | 0.1 | ___do___ | −60 +200 | 71 | 12,606 | 0.0064 | 9.2 | 10.3 | 0.5 |
| Rounded Nutshells (1) | −12 +20 | 0.25 | ___do___ | −60 +200 | 69 | 15,184 | 0.0064 | 7.7 | 6.2 | 0.333 |
|  | −12 +20 | 0.1 | ___do___ | −60 +200 | 69 | 5,607 | 0.0064 | 7.7 | 15.2 | 0.51 |
| Alloy Aluminum (2) | −12 +16 | 0.25 | ___do___ | −60 +200 | 46 | 58,984 | 0.0064 | 9.2 | 6.2 | 0.42 |
|  | −12 +14 | 0.25 | Ottawa Sand | −30 +40 | 2,856 | 6,000 | 0.0214 | 3.1 | 2.1 | 0.42 |
|  | −12 +14 | 0.25 | ___do___ | −20 +25 | 3,531 | 2,321 | 0.0331 | 2.0 | 2.1 | 0.42 |
|  | −12 +14 | 0.25 | ___do___ | −16 +18 | 3,737 | 1,884 | 0.0469 | 1.4 | 2.1 | 0.42 |
|  | −12 +14 | 0.25 | Gopher Sand | −14 +16 | 1,362 | 236 | 0.0555 | 1.2 | 2.9 | 0.09 | in. From previous experience it has been found desirable to employ a pumping rate greater than 5 bbls./min. and preferably a pumping rate of at least 10 bbls./min. is employed. However, a more optimum pumping rate of about 20 bbls./min. generally is employed to assure satisfactory deposition of the particles in the fractures. This assures a fluid velocity sufficient to prevent segregation of the different size particles so that the desired spacing of the propping particles in the fracture is obtained. The carrying fluid in which the particles are suspended may be the same fluid used for fracturing or it may be another suitable fluid, such as a hydrocarbon or water.

The following description of results obtained in laboratory experiments illustrates the effectiveness of the present invention in increasing the permeability of a fracture over the results obtained by prior art methods. The data were obtained in laboratory tests where conditions could be closely controlled and the results carefully measured. In this work a 20-ton capacity hydraulic press was arranged so that pressures could be applied to short cylindrical core sections sawed to expose smooth circular surfaces 3½ inches in diameter. The propping material and spacer material under test were uniformly distributed over the surface of one of these core sections, the assembly mounted in the press and the desired pressure applied by a hydraulic pump connected to the ram.

The effective overburden pressure on the propping materials was determined from the applied ram pressure, the equivalent well depth being determined from the In conducting the tests reported in the above table, the flow capacity was initially determined after placing the particles under pressure and before flushing, with the flow capacity again being determined after flushing the spacer material from between the core sections by flowing water through a central opening in the upper core section. For the above-stated conditions, unspaced deformable propping particles provided a much higher flow capacity than sand particles of the same size. It is further seen that by spacing malleable particles, such as alloy aluminum particles with a very fine spacer material, such as −60 +200 McLish sand, a remarkable increase in flow capacities is obtained after the spacer particles are flushed from between the propping particles. However, where spacer particles which approach the size of the propping particles are employed, there is a general decrease in flow capacity after flushing. This is believed attributable to plugging resulting from the bridging action of the larger particles which cannot be readily flushed from the fracture.

In the practice of the invention it may be desirable to taper the size of propping particles placed in a fracture, since the fracture is generally tapered from a very small fraction of an inch at its outer extremity to as much as ½ inch or more near the well bore. Therefore, the first props injected may be of relatively small particle size, with the particle size tapering upwardly as the props are deposited in the fracture, so that the final propping particles may be of relatively large particle size, in the order of perhaps 4 mesh. The placing of tapered propping particles in this manner may be performed in either a continuous or stepwise manner. In either case, it is extremely important that the size ratio of the spacer material to the propping material be maintained within the limits described above. Otherwise, deleterious plugging of the fracture will likely occur. In general, the smaller the particle size of the spacer material, the less likelihood there is of plugging and the smaller particles facilitate flushing from the fracture. Thus, very small particles of spacer material in the range of 200 mesh, or even smaller, may be employed with either large propping materials, such as −12 +16 mesh aluminum particles, or with smaller propping particles of about 30 mesh size, as long as the above-mentioned ratio is maintained.

Following the deposition of the particles of propping material and spacer material in the fracture, the pressure is reduced to permit the overburden to settle on top of the propping particles. Advantageously, the well is shut in and the fluid pressure permitted to bleed off into the formation, so that there will be no tendency for the propping material to be flushed back into the well bore by production before the overburden has had time to settle down on the propping particles. After the overburden has settled down on the propped particles, so that the propped particles are held in place between the surfaces of the fracture, fluid is passed through the fracture toward the well bore to flush the spacer particles from the fracture. Typically, when the well is opened to production, the fine spacer sand will be flushed out of the fracture, leaving channels between the propping particles which will make high capacity flow channels. The particles of spacer material which are flushed out of the fracture into the well bore may be carried to the surface by natural production flow, or, if the flow rate is not great enough, the spacer particles may be flushed from the fracture by fluid pumped through the production tubing and flowed out through the tubing-casing annulus. Where no tubing is employed in the well, the spacer particles can be removed by bailing.

From the foregoing description of the invention, various modifications and alterations will become apparent to the artisan without departing from the spirit and scope of the invention.

I claim:

1. In the treatment of a subterranean formation penetrated by a wellbore wherein a fracturing fluid is forced down said wellbore to contact said formation under sufficient pressure to fracture said formation, the improvement comprising passing into the resulting fracture a fluid suspension of particulate solids comprising propping particles and spacer particles, the average propping particle size being at least about 7 times the average spacer particle size, and the volume ratio of the propping particles to spacer particles being between about 10:1 to about 2:1; permitting the overburden to settle on said propping particles in said fracture the fracture being propped open by said propping particles; and subsequently flushing said spacer particles from said fracture to provide fluid flow channels between the propping particles retained in said fracture.

2. The method of claim 1 wherein said propping particles are formed of a malleable material having a compressive strength sufficient to support said overburden.

3. The method of claim 1 wherein spacer particles comprise a rounded sand.

4. The method of claim 1 wherein said propping particles comprise rounded particles selected from the group consisting of hard seed particles, metallic particles and plastic particles having a compressive strength of at least 5,000 pounds per square inch at the well conditions.

5. The method of claim 1 wherein said propping particles and said spacer particles are of a size in the range of about −12 +20 U.S. Standard sieve mesh and −60 +200 U.S. Standard sieve mesh, respectively.

6. The method of claim 1 wherein said fluid suspension is pumped into said well at a pumping rate of at least about 10 barrels per minute.

7. The method of claim 1 wherein said well is shut in after depositing said particles in said fracture and fluid pressure in said well is permitted to bleed off into said formation, and wherein fluid produced from said formation is employed to flush said spacer particles from said fracture into said wellbore.

8. The method of claim 1 wherein the average particle size of said propping particles is at least 30 U.S. Standard sieve mesh.

References Cited by the Examiner
UNITED STATES PATENTS

| | | | |
|---|---|---|---|
| 2,950,247 | 8/1960 | McGuire et al. | 166—42.1 X |
| 2,962,095 | 11/1960 | Morse | 166—42.1 X |
| 3,075,581 | 1/1963 | Kern | 166—42.1 |
| 3,121,464 | 2/1964 | Huitt et al. | 166—42.1 |

CHARLES E. O'CONNELL, *Primary Examiner.*

S. J. NOVOSAD, *Assistant Examiner.*